United States Patent
Furnas

(10) Patent No.: US 10,871,400 B2
(45) Date of Patent: Dec. 22, 2020

(54) RETARDATION PROFILE FOR STRESS CHARACTERIZATION OF TUBING

(71) Applicant: CORNING INCORPORATED, Corning, NY (US)

(72) Inventor: William John Furnas, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/534,083

(22) Filed: Aug. 7, 2019

(65) Prior Publication Data

US 2020/0064197 A1   Feb. 27, 2020

Related U.S. Application Data

(60) Provisional application No. 62/723,081, filed on Aug. 27, 2018.

(51) Int. Cl.
*G01J 4/00* (2006.01)
*G01B 1/00* (2006.01)
(Continued)

(52) U.S. Cl.
CPC ............ *G01J 4/00* (2013.01); *G01B 1/00* (2013.01); *G01B 11/06* (2013.01); *G01B 11/12* (2013.01); *G01J 2004/001* (2013.01)

(58) Field of Classification Search
CPC ........ G01J 4/00; G01J 2004/001; G01B 1/00; G01B 11/06; G01B 11/12
(Continued)

(56) References Cited

U.S. PATENT DOCUMENTS

| | | | | |
|---|---|---|---|---|
| 3,994,599 A | * | 11/1976 | Southwell | G01B 11/06 356/504 |
| 4,822,171 A | * | 4/1989 | Brand | G01B 11/06 356/632 |

(Continued)

FOREIGN PATENT DOCUMENTS

| | | |
|---|---|---|
| CN | 205066980 U | 3/2016 |
| CN | 106813819 A | 6/2017 |
| EP | 1795862 B1 | 8/2009 |

OTHER PUBLICATIONS

Aben, H; "Integrated Photoelasticity"; McGraw-Hill Inc.; 1979; Chapter 7, p. 116-140.
(Continued)

*Primary Examiner* — Roy M Punnoose
(74) *Attorney, Agent, or Firm* — Michael G. Panian

(57) ABSTRACT

Provided herein are systems and methods for monitoring radial stresses in glass tubing. In some embodiments, a measurement system includes a light source delivering a light to a tube, and a polarizer receiving the light after the light is refracted through a wall of the tube. The measurement system may further include a detector receiving the light from the polarizer, the detector operable to capture a first image of the light at a first polarization state and a second image of the light at a second polarization state. The system may further include a controller operable to determine a retardation profile related to the stress profile of the wall of the tube by determining a retardation magnitude of the light refracted through the wall of the tube based on a difference between the first image of the light and the second image of the light.

20 Claims, 8 Drawing Sheets

(51) Int. Cl.
*G01B 11/06* (2006.01)
*G01B 11/12* (2006.01)

(58) Field of Classification Search
USPC .......................... 356/33, 239.1, 239.4, 240.1
See application file for complete search history.

(56) References Cited

U.S. PATENT DOCUMENTS

| | | | | |
|---|---|---|---|---|
| 4,859,861 | A * | 8/1989 | Mersch | G01B 11/255 |
| | | | | 250/559.22 |
| 5,118,954 | A * | 6/1992 | Grosso | G01B 11/105 |
| | | | | 250/559.24 |
| 5,291,271 | A * | 3/1994 | Juvinall | G01B 11/06 |
| | | | | 356/632 |
| 6,133,999 | A * | 10/2000 | Myers | G01B 11/06 |
| | | | | 356/239.4 |
| 8,134,695 | B2 | 3/2012 | Furnas et al. | |
| 9,244,020 | B2 | 1/2016 | Leconte et al. | |
| 10,024,784 | B2 | 7/2018 | Sudo et al. | |
| 2015/0066393 | A1 | 3/2015 | Liu et al. | |
| 2015/0204797 | A1* | 7/2015 | Colle | G01N 21/8851 |
| | | | | 356/239.4 |
| 2016/0151957 | A1* | 6/2016 | Wolfe | B29C 49/78 |
| | | | | 425/140 |
| 2017/0167854 | A1* | 6/2017 | Imaizumi | G01B 11/12 |
| 2019/0271535 | A1* | 9/2019 | Haitjema | G01N 21/41 |

OTHER PUBLICATIONS

Anton; "Technology of Integrated Photoelasticity for Residual Stress Measurement in Glass Articles of Axisymmetric Shape", Thesis on Natural and Exact Sciences B76, Tallinn 2008, Tallinn University of Technology. 33 Pages.

Artisan Technology Group; Citizen/Micron/Displaytech DR95 FLC Driver; https://www.artisantg.com/Scientific/64730/Citizen_Micron_Displaytech_DR95_FLC_Driver (accessed Sep. 6, 2017).

Read; "An Optical Method for Measuring the Stress in Glass Bulbs" Journal of Applied Physics 21, 250 (1950); 9 Pages.

Kishii et al. "Laser senarmont biascope for residual surface stress measurement of float glasses," Optics and Laser Technology 14(5) Oct. 1982, pp. 255-260.

Bruno et al. "A full-field method for measuring residual stresses in optical fiber," Optics and Lasers in Engineering 44(6) Jun. 2006, pp. 577-588.

European Patent Application No. 19193011.4; Extended Search Report dated Dec. 18, 2019; European Patent Office; 6 Pgs.

* cited by examiner

US 10,871,400 B2

RETARDATION PROFILE FOR STRESS CHARACTERIZATION OF TUBING

CROSS REFERENCE TO RELATED APPLICATIONS

This application claims the benefit of priority under 35 U.S.C § 120 of U.S. Provisional Application Ser. No. 62/723,081 filed on Aug. 27, 2018, the content of which is relied upon and incorporated herein by reference in its entirety.

FIELD

The present disclosure relates generally to the field of dimensional measurement systems and, more particularly, to a non-contact system for determining a retardation profile for stress characterization of transparent glass tubing.

BACKGROUND

Across-wall-thickness stress profiles are of interest when manufacturing glass tubing and other cylindrical shapes that have been processed to include protective stresses. Examples include common tubing, laminate wall tubing, and containers, such as ion exchanged vials or thermally tempered vessels. In the course of manufacturing glass tubing, a natural radial stress profile across the wall thickness develops because the outer surface cools faster than the inner surface. More specifically, the outer surface is in compression and the inner surface is in tension. The stress magnitude is related to the cooling being applied in the manufacturing process as the glass temperature transitions from a softening point through annealing temperature to below the strain temperature. The stress at room temperature develops when the outer surface temperature is lower than the inner surface temperature as the part cools through the strain point.

Conventional stress measurement in tubing is often done using one of two techniques, both of which are offline and require cutting a section of tubing. The first technique involves sectioning the tubing so the axial path length is approximately 6 to 8 times the wall thickness, polishing the ends, and then measuring the radial retardation profile with the optical path in an axial direction. The radial stress profile may be calculated based on retardation of light, the axial path length, and a stress optic coefficient. The second technique involves inserting the end of the tube in a glass immersion tank with index fluid matched to the tubing, analyzing a tangential view for the retardation profile, and then performing an analysis to calculate the radial stress profile as a function of radius (i.e., across the wall thickness).

While these techniques are options for simple thermal stress profiles, the techniques require sections of tubing and, therefore, do not permit online measurements. Furthermore, for ion exchanged (IOX) containers, such as vials, contact with immersion fluid is often required. Accordingly, an approach for the rapid, non-contact, and online monitoring for changes in radial stresses in glass tubing and containers is desired.

SUMMARY

In one example of the present disclosure, a measurement system may include a light source delivering a light to a tube, a polarizer receiving the light after the light is refracted through a wall of the tube, and a detector receiving the light from the polarizer. The detector may be operable to capture a first image of the light at a first polarization state and a second image of the light at a second polarization state. The measurement system may further include a controller operable to determine a retardation profile of the wall of the tube by determining a retardation magnitude of the light refracted through the wall of the tube based on a difference between the first image of the light and the second image of the light.

In another example of the present disclosure, a non-contact tubing measurement system may include a light source delivering a light to a transparent tube, the light being a collimated line-shaped beam, and a polarizer receiving the light after the light is refracted through a wall of the transparent tube. The non-contact tubing measurement system may further include a detector receiving the light from the polarizer, the detector operable to capture a first image of the light at a first polarization state and a second image of the light at a second polarization state. The non-contact tubing measurement system may further include a controller operable to determine a retardation profile of the transparent tube by determining a retardation magnitude of the light refracted through the wall of the transparent tube based on a difference between the first image of the light and the second image of the light.

In yet another example of the present disclosure, a method for determining a stress profile of a tube wall may include delivering a light from a light source to a transparent tube, receiving the light at a polarizer after the light is refracted through a wall of the transparent tube, and receiving the light from the polarizer at a detector. The method may further include capturing, by the detector, a first image of the light at a first polarization state and a second image of the light at a second polarization state, and determining a retardation profile of the transparent tube from a retardation magnitude of the light refracted through the wall, wherein the retardation magnitude is determined based on a difference between the first image of the light and the second image of the light.

BRIEF DESCRIPTION OF THE DRAWINGS

Non-limiting embodiments of the present disclosure are described by way of example with reference to the accompanying figures, which may not be drawn to scale. In the figures, each identical or nearly identical component illustrated is typically represented by a single numeral. For purposes of clarity, not every component is labeled in every figure, nor is every component of each embodiment shown where illustration is not necessary to allow those of ordinary skill in the art to understand the disclosure. In the figures.

DETAILED DESCRIPTION

Figure 1:
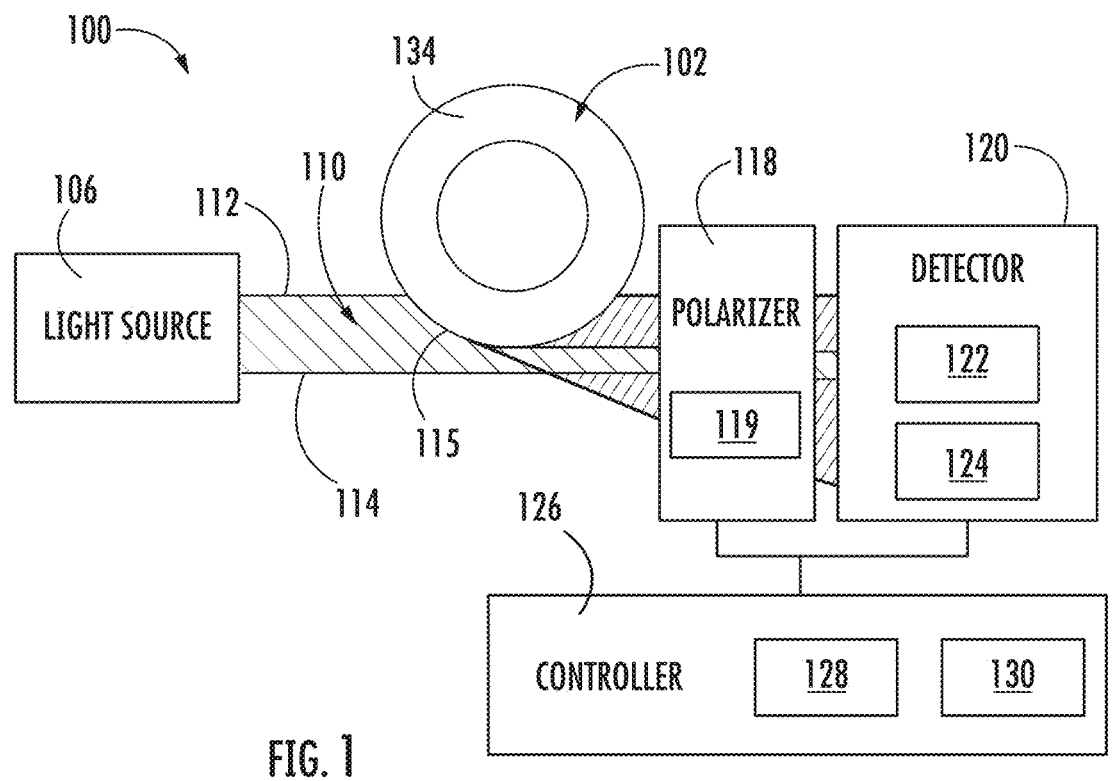
FIG. 1 is a block diagram of a non-contact tubing measurement system according to embodiments of the present disclosure.

The terminology used herein is for the purpose of describing particular embodiments only, and is not intended to be limiting beyond the scope of the appended claims. Furthermore, the present disclosure is not limited to the particular embodiments described herein. Unless otherwise defined, all technical terms used herein have the same meaning as commonly understood by one of ordinary skill in the art to which the disclosure belongs.

The present disclosure relates to systems and methods for monitoring retardation and stresses in glass tubing. In some embodiments, a measurement system includes a light source delivering a light to a tube, and a polarizer receiving the light after the light is refracted through a wall of the tube. The measurement system may further include a detector receiving the light from the polarizer, the detector operable to capture a first image of the light at a first polarization state and a second image of the light at a second polarization state. The system may further include a controller operable to determine a retardation profile of the wall of the tube by determining a retardation magnitude of the light refracted through the wall of the tube based on a difference between the first image of the light and the second image of the light.

Various embodiments herein further relate to measurement systems and methods, which permit online, non-contact monitoring of the across-the-wall retardation profile. To get a detailed stress profile, often a combination of measurements and modeling is performed to define nominal process conditions, as well as limits for the process. The nominal and limit stress profiles can then be used to set process monitoring values from this measurement system. The raw data from the stress measurement system is directly related to retardation effects from magnitude of the axial and radial (and to a lesser extent, hoop) stresses in the cylindrical wall.

In some embodiments, the system includes a line of light projected at an angle to the wall axis to simultaneously determine where the tubing edge is, and for light passing through the wall, determine the radial distance in from the outer wall. The system monitors the polarization changes in the light in relation to the path through the tubing wall, thus providing retardation and stress information. During use, the system may monitor shifts in the beam path from entrance to exit and off the surface, thus providing information about diameter and thickness.

Although non-limiting, embodiments herein will be described in the context of a curved wall, such as a transparent glass tube. When light is reflected off an inside wall of curvature, the optical path length per radial position through the wall outer region is longer than the optical path per radial position near the inner region. The unequally distributed path means that there is no longer a force balance along the beam path, and a retardation signal/profile associated with radially changing stress profiles is present.

Measurement techniques described herein can also provide detail about the specimen position and radius of curvature. A continuum of data is available by using an area detector and projected polarized light line at an angle to the tubing axis. The continuum of data along the projected line gives multiple data points for analysis to improve the detail and reduce the measurement system noise.

Furthermore, measurement techniques described herein permit online measurement because the tubing does not require sectioning or polishing. If already cut, measurement of the tube does not require the tubing to be placed in an immersion tank, for example. The position requirements are less strict (e.g., millimeters instead of micrometers), and the system is capable of detecting a current position of the tube, making it effectively self-aligning. The system can be configured around a continuous process, with measurements taken at a rate limited primarily by camera frame rates and polarization switching of a ferroelectric liquid crystal (FLC). Given the known axial stress orientation, the detection system can be optimized and simplified to two polarization states.

In other embodiments, measurement may be accomplished using a circular analyzer and projecting beam switch, or by having 45° and 135° oriented linear polarization states. In yet other embodiments, measurement may be performed using a rotating polarizer. In some embodiments, the system may perform similar to a grey field polarimeter, which includes a circular polarized light source and linear polarized detectors. The orientation of two detector linear polarization states may be at approximately 45° to the stress axis to maximize the system sensitivity. With the circular light source, the light intensity change per unit of retardation is maximized. The same sensitivity can be realized with a circular analyzer and two light source linear polarization states. Furthermore, alignment of the tube is less critical because the line shaped beam shape remapped on the array sensor provides information about specimen position and the light path.

In some embodiments, the plurality of measurement positions from the measurement system are rotationally spaced about the tube. This way, it is possible to measure the thickness and retardation profile of the glass in more points angularly distant from each other, and to then obtain the variation of thickness and retardation profile of the tube in a circumferential direction, detecting potential shape defects, such as lack of concentricity between the internal and external surfaces of the tube.

Alternatively, or in combination, the plurality of measurement positions may be longitudinally spaced from each other along the length of the tubing. As such, it is possible to measure the thickness and retardation profile of the tube in more points longitudinally spaced from each other, thus increasing the number of measurement positions. In the case the tube advances longitudinally along a tube draw, embodiments of the present disclosure may obtain the variation of thickness and stresses of the tube in both circumferential and longitudinal directions over time.

Based on the dimensional measurements, an output may be provided to a tubing forming device for controlling the production of the tube. For example, on the basis of a detected wall thickness value and/or retardation profile, it may be possible to correct the shaping step of the tube. In the case of continuous production of glass tubing that provides a casting orifice within which a tube shaping element is arranged, the output may provide feedback control of the position of the tube shaping element.

Turning now to FIG. 1, a non-contact tube measurement system (hereinafter "system") 100 according to embodiments of the disclosure will be described in greater detail. As shown, the system 100 operates on a tube 102, which may be drawn along one or more portions of a tube draw. The tube 102 may be an elongated glass tube continuously drawn in a direction from a tubing forming device towards a tube cutter (not shown). In some embodiments, the tube 102 may be drawn without rotation. In other embodiments, the tube 102 may be the wall of a container. In other embodiments, the tube 102 may be the wall of an ion exchanged container. In this case, the magnitude and shape of the stress profile may create a much larger retardation signal than is typical with drawn tubing.

The system 100 may include a light source 106 delivering a light 110 to the tube 102. In some embodiments, the light source 106 may be a circular polarized line light projector operable to deliver the light 110 in the form of a collimated line-shaped beam. As shown, the light 110 may have a first edge 112 and a second edge 114. The tube 102 may be arranged relative to the light source 106 such that the first edge 112 enters the tube 102, while the second edge 114 passes by an outside wall surface 115 of the tube 102 and is received directly at a polarizer 118. As shown, the tube 102 is positioned between the light source 106 and the polarizer 118. In some embodiments, the polarizer 118 may include a ferroelectric liquid crystal (FLC). As shown, a portion of the light 110 passes through the tube 102 where it is refracted before being received by the polarizer 118.

The system 100 may further include a detector 120 receiving the light 110 from the polarizer 118. In some embodiments, the detector 120 may be an array detector (e.g., a camera sensor) operable to capture a first image 122 of the light 110 at a first polarization state, and a second image 124 of the light at a second polarization state. In some embodiments, the polarizer 118 may include a driver 119 operable to switch between the first polarization state and the second polarization state. Given a known axial orientation of the stresses, the system 100 can be optimized and simplified to two polarization states. Although non-limiting, in some embodiments the system 100 may not include a focusing element, between the detector 120 and the tube 102. Instead, the detector 120 may operate in silhouette, or shadow cast.

In other embodiments, the first and second polarization states can be captured in a single frame using pixelated polarizer sensors. A sensor with different regions of a sensor array with different polarization states may also be used. With the sensor array, multiple lines of light can be projected with different polarization states. In yet other embodiments, a polarizing beam splitter with two sensors may be used.

In some embodiments, the system 100 may include the polarizer 118 positioned in front of the detector 120, while a linear polarized light is projected at 45° and 135°. This configuration may permit a more compact mechanical setup between the tube 102 and the detector 120. In the configuration of FIG. 1, the circularly polarized rays may be modified by the retardation along the beam path. Part of the retardation is integrated traveling from the outside wall surface 115 to an inside surface of the tube 102. Upon reflecting on the inside surface, the hand of the circular polarization, or partly elliptical from the retardation from the outside to the inside, is flipped. On the path from the inside surface to the outside surface, the retardation continues to integrate, increasing the sensitivity.

The detector 120 and the polarizer 118 operate with a controller 126, which is configured to determine a retardation profile 128 of a wall 134 of the tube 102 by determining a retardation magnitude 130 of the light 110 refracted through the wall 134 of the tube 102. The retardation magnitude 130 may be determined based on a difference between the first image 122 and the second image 124 of the light 110. In some embodiments, the retardation profile 128 is the retardation magnitude 130 integrated for each light path (e.g. each ray) of the light 110. The difference image may be intensity normalized, such as difference over sum, to account for various sources of intensity variation. An offset may be added to help represent negative values in the result. In some embodiments, as will be described in further detail below, the controller 126 may be operable to sum the first image 122 and the second image 124 to determine each of: a direct beam location, an edge of the tube 102, and a beam intersecting the tube 102 tangentially at different radial distances. The controller 126 may also determine a diameter of the tube 102, as well as a thickness of the wall 134 of the tube 102.

In some embodiments, connected to the controller 126 may be a user interface (not shown), which may display feedback from the system 100 to an operator. The user interface may include various other peripheral input and output devices, such as speakers, printers, keyboards, and so forth. In various embodiments, the user interface and the controller 126 may be positioned in close proximity to the system 100, or may be located remotely from one another.

It will be appreciated that the controller 126 may include any electronic device capable of receiving, processing, and sending information related to the dimensional measurement characteristics or attributes of the tube 102. Examples of an electronic device may include, without limitation, an embedded controller, a computer, a personal computer (PC), a desktop computer, a laptop computer, a notebook computer, a netbook computer, a handheld computer, a tablet computer, a server, a server array or server farm, a web server, a network server, an Internet server, a work station, a main frame computer, a supercomputer, a network appliance, a web appliance, a distributed computing system, multiprocessor systems, processor-based systems, wireless access point, base station, subscriber station, radio network controller, router, hub, gateway, bridge, switch, machine, or combination thereof. Embodiments herein are not limited in this context.

The controller 126 may execute processing operations or logic for the determination of the dimensional measurement characteristics or attributes of the tube 102. The controller 102 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 2A:
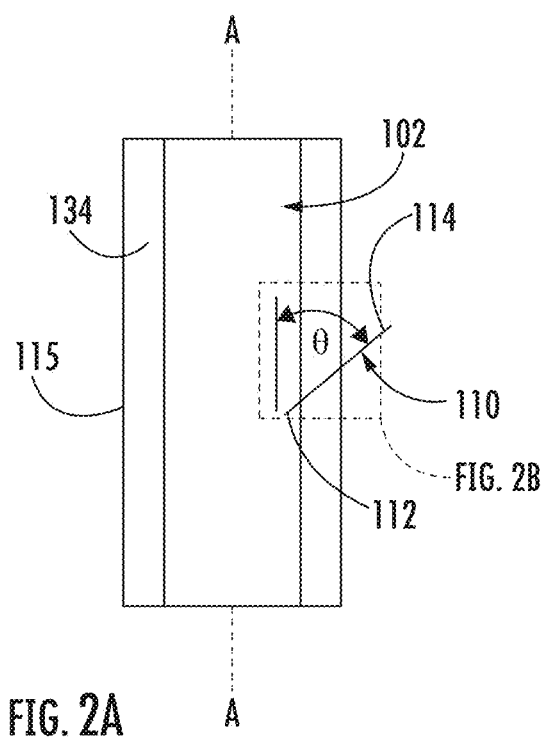
FIG. 2A is a side cross-sectional view of a tube and a light of the non-contact tubing measurement system according to embodiments of the present disclosure.
Figure 2B:
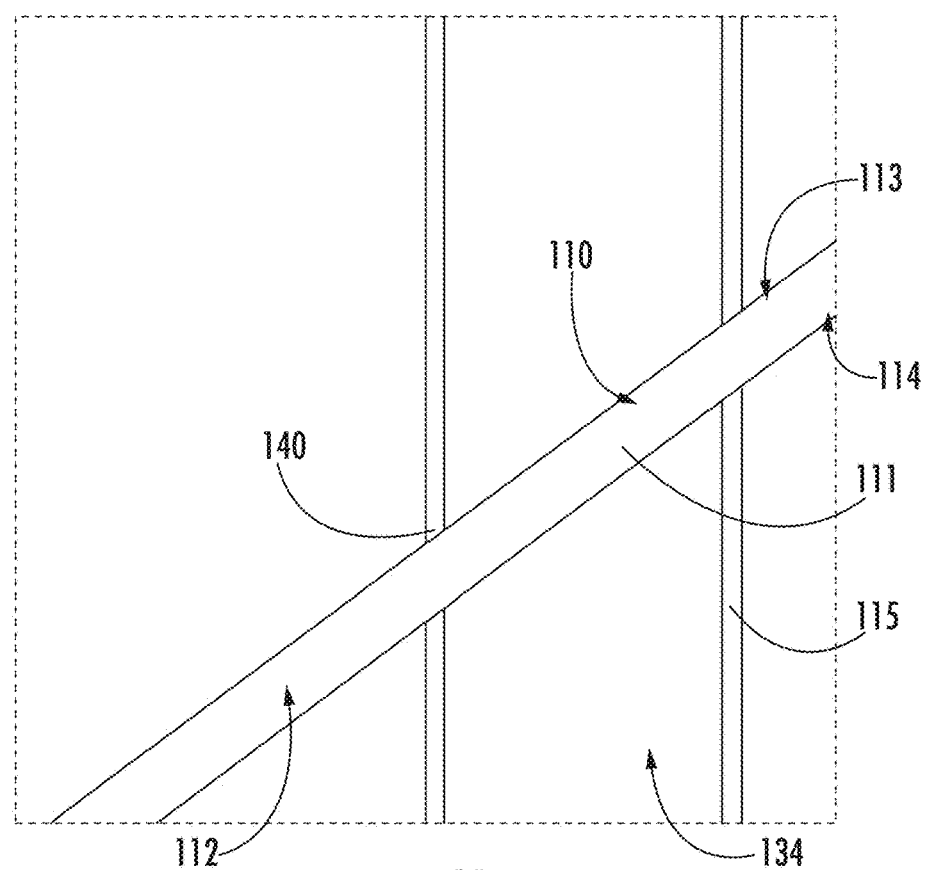
FIG. 2B is a close-up side cross-sectional view of the tube and light of FIG. 2A according to embodiments of the present disclosure.

Turning now to FIG. 2A, operation of the light source 106 will be described in greater detail. As shown, the tube 102 has a lengthwise tube axis 'L-L' extending through a center of the tube 102. In exemplary embodiments, the light 110 is a collimated line-shaped beam delivered to the tube 102 at an angle θ relative to the lengthwise tube axis 'L-L'. In some embodiments, the angle θ is less than ninety (90) degrees and greater than zero (0) degrees. Although non-limiting, the light 110 may be delivered to the tube 102 at an angle of approximately forty-five degrees (45°). As shown in greater detail in FIG. 2B, the circularly polarized light 110 is projected as a line, which overlaps the outside wall surface 115 of the wall 134. The length of the line made by light 110 may generally be thicker than the thickness of the wall 134. In some embodiments, the first edge 112 is projected into the tube 102, while the second edge 114 passes beyond the tube 102 without entering the tube 102. A central portion 111 of the light 110 may be projected into the wall 134, between the outside wall surface 115 and an inside wall surface 140. An outer portion 113 of the light 110, including the second edge 114, may be delivered directly to the polarizer 118 (FIG. 1). Without any refraction from the tube 102, the outer portion 113 of the light 110 is delivered directly onto the detector 120, and the beam line shape is imaged, as demonstrated in FIG. 2C. There is nothing to change the projected line polarization state for the outer portion 113 of the light. As a result, the shape of the signal on the detector 120 further provides information about tube position and path of the light 110. The portion of the light 110 that intentionally misses the wall (e.g., the outer portion 113 and the second edge 114) provides information about where the tube 102 is. Self-alignment of the tube 102 relative to the light 110 can therefore be accomplished.

Figure 2C:
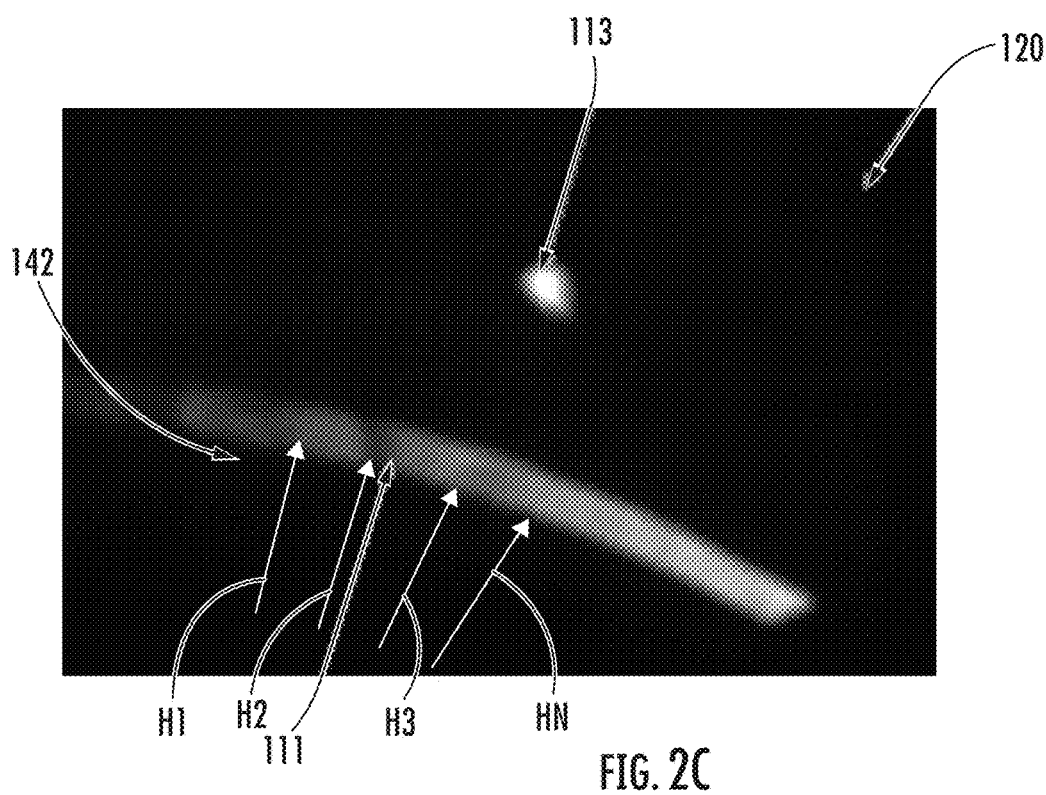
FIG. 2C is an example of a detected image after the light passes and refracts through the tubing according to embodiments of the present disclosure.

In some embodiments, the line shape of the light 110 is delivered at an angle relative to the tube 102 so that the vertical position on the detector 120 that the light 110 lands is related to the horizontal position of the original illumination. As shown in FIG. 2C, the central portion 111 of the light 110 is delivered to the detector 120 in a curved or angled configuration after being refracted through the wall 134. Heights (e.g., H1, H2, H3, Hn, etc.) in the fan 142 of the beam corresponding to the central portion 111 of the light 110 relate to different radial distances based upon the angle, θ, of the projected line. In an example embodiment, the path of a particular ray of the light 110 through the wall may be known, along with the radial position the initial ray strikes the wall 134. By having the beam projection line shaped, and then tipped, heights H1-HN also represent horizontal position. The position relative to the wall 134 is referenced by the part of the beam, for example, the outer portion 113, which intentionally misses the wall 134. In exemplary embodiments, a retardation profile is generated from the retardation information along the central portion 111 of the light 110. More specifically, the retardation profile is the retardation magnitude integrated for each light path of the fan of the beam in the central portion 111 of the light 110.

In some embodiments, with the projected line at 45 degrees from vertical, each camera pixel vertically represents the same distance of the original beam along the radial line perpendicular to the light 110. Adjusting the angle θ can further increase or decrease the radial resolution. Different angles of the light 110 may be chosen to improve performance on thinner or thicker walled tubing.

Figure 3:
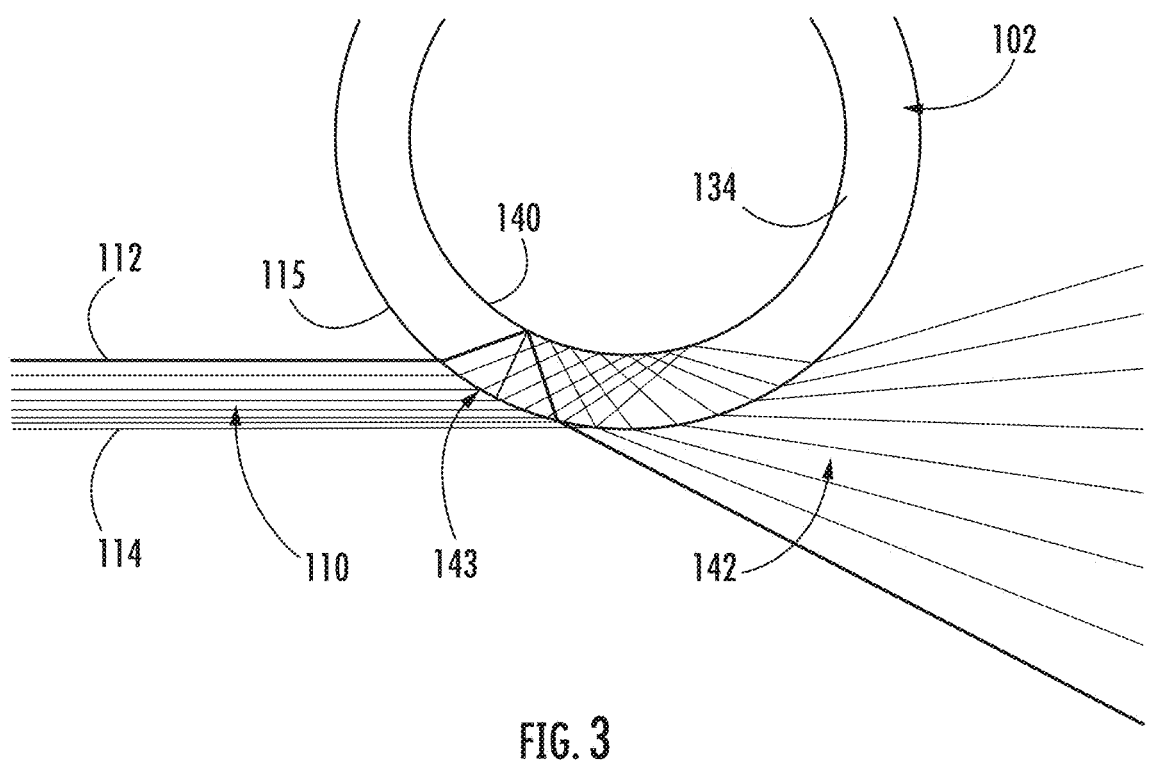
FIG. 3 demonstrates a plurality of ray traces of the light entering a tube according to embodiments of the present disclosure.

Turning now to FIG. 3, refraction of the light 110 through the tube 102 according to embodiments of the present disclosure will be described in greater detail. As shown, the light 110 is represented as a plurality of rays, or ray traces, extending along a same plane. In this embodiment, the central portion 111 of the light 110 is reflected off the outside wall surface 115 of the tube 102. The central portion 111 of the light 110 then refracts into the tubing 102, and passes through the wall 134 at a non-normal angle to the outside wall surface 115. The central portion 111 of the light 110 then reflects off the inside wall surface 140, and traverses back to the outside wall surface 115, where it is refracted out into the air.

In various embodiments, the radius of curvature and wall thickness of the tube 102 factor into redirecting the beam rays of the light 110 in a particular direction associated with the radial position of the rays. The height on the detector 120 (FIG. 1) where the rays land is related to the radial position. For example, the starting reference for the height to tubing radial position from the outside wall surface 115 is the position where the light 110 outside the tube 102 is disrupted by the tube 102. The outer portion 113 of the light 110 outside the tube 102 provides information to determine the horizontal position of the outside wall surface 115, an intensity reference, and the line shaped beam inclination. In some embodiments, the inclination may not be precisely at 45 degrees. Instead, the inclination may be oriented intentionally at some other angle.

A pattern may be made by the central portion 111 of the light 110 intersecting the tube 102 as it is reflected and refracted. For example, the light 110 is reflected off the outside wall surface 115. Initially, because of the high incidence angle relative to the surface normal, most of the rays are reflected, causing the light 110 to form a fanned shape 142. The fanned shape 142 has a diagonal configuration associated with the point of entry 143 where the light 110 is incident on the tube 102. The fanned shape 142 of the light 110 is the information carrying portion of the beam. For example, the information may include the retardation that the light 110 experiences passing through the wall 134, reflecting off the inside surface 140, and exiting the wall 134 from the outside surface 115. The retardation is related to the stress profile and magnitude in the wall 134.

More specifically, in glass, a known relationship between stress and retardation, referred to as the stress optic coefficient (e.g., ASTM C770), may be leveraged. Retardation detection may be done at a specific wavelength, and as a fraction of the specific wavelength. The retardation may then be converted to units of nm, for example, based upon the wavelength of light being used, and the fraction of a wavelength detected. In the optical analysis, the retardation caused by stress is detected using polarized light, and the observing phase shift revealed in the intensity change of the components of the polarized light. With increasing stress comes increasing retardation.

As will be described in greater detail below, the outer portion of the light 110 outside the tube 102 provides information to determine a polarization intensity reference for the first image 122 of the light 110 at the first polarization state, and for the second image 124 of the light at the second polarization state. The light 110 entering the tube 102 results in unequal path lengths in rays not traveling normal to the surface. Because the paths are unequal, integrated retardation will not be zero and the magnitude will be representative of the across-the-wall stress profile. To analyze the retardation, polarization elements, such as the polarizer 118 of FIG. 1, may be used. The polarizer 118 may be a FLC with the driver 119 capable of switching between +5 Volts and −5 Volts. The two states pass linear polarization of 45 and 135 degrees, for example. As demonstrated by FIGS. 4A-4B, images may be taken at each polarization state. In non-limiting embodiments, FIG. 4A may represent the first image 122 of the light 110 at the first polarization state, while FIG. 4B may represent the second image 124 of the light 110 at the second polarization state.

In the example shown, the light 110 may pass through a continuously variable, zero-order retarder, such as a Babinet compensator, which shows an opposing pattern of bright sections 151 and dark sections 152 with changing FLC control voltage. A configuration with source polarized light at 45 or 135 degrees would have one image bright and the other dark. The intensity variation is at the crest or trough of the sinusoidal intensity curve. The shape of the light 110 can be used to interrogate the retardation in the wall. This configuration may be less sensitive for small retardation magnitudes. However, it may be more sensitive to small changes in larger retardation values that would shift the analysis into the high slope portion of the intensity change pre-retardation change curve.

Figure 4A:
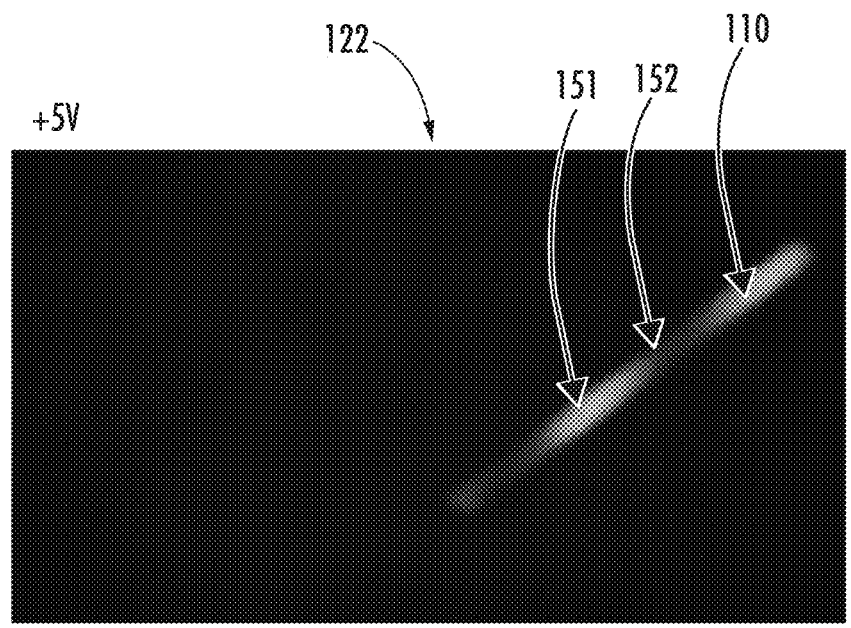
FIG. 4A depicts a first image of a light at a first polarization state according to embodiments of the present disclosure.
Figure 4B:
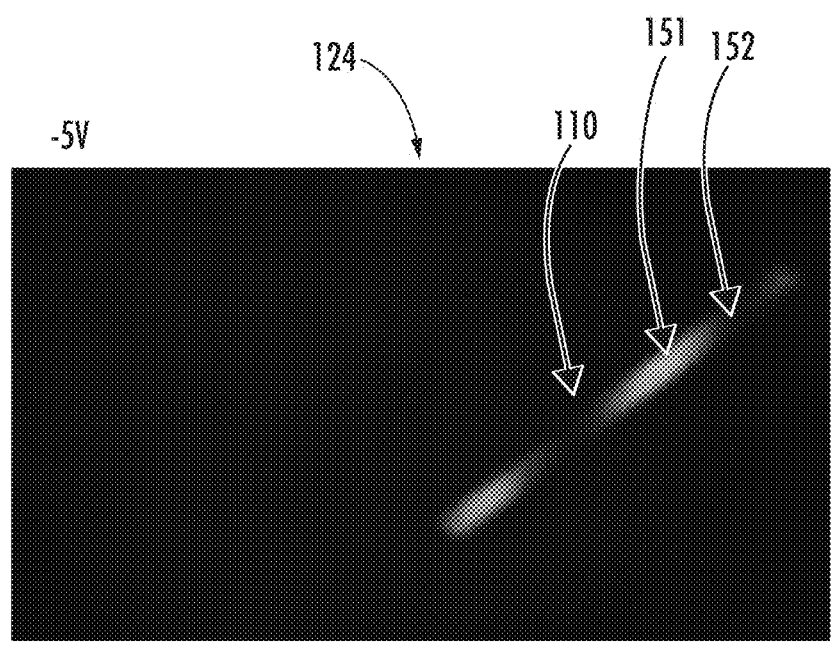
FIG. 4B depicts a second image of the light at a second polarization state according to embodiments of the present disclosure.
Figure 5:
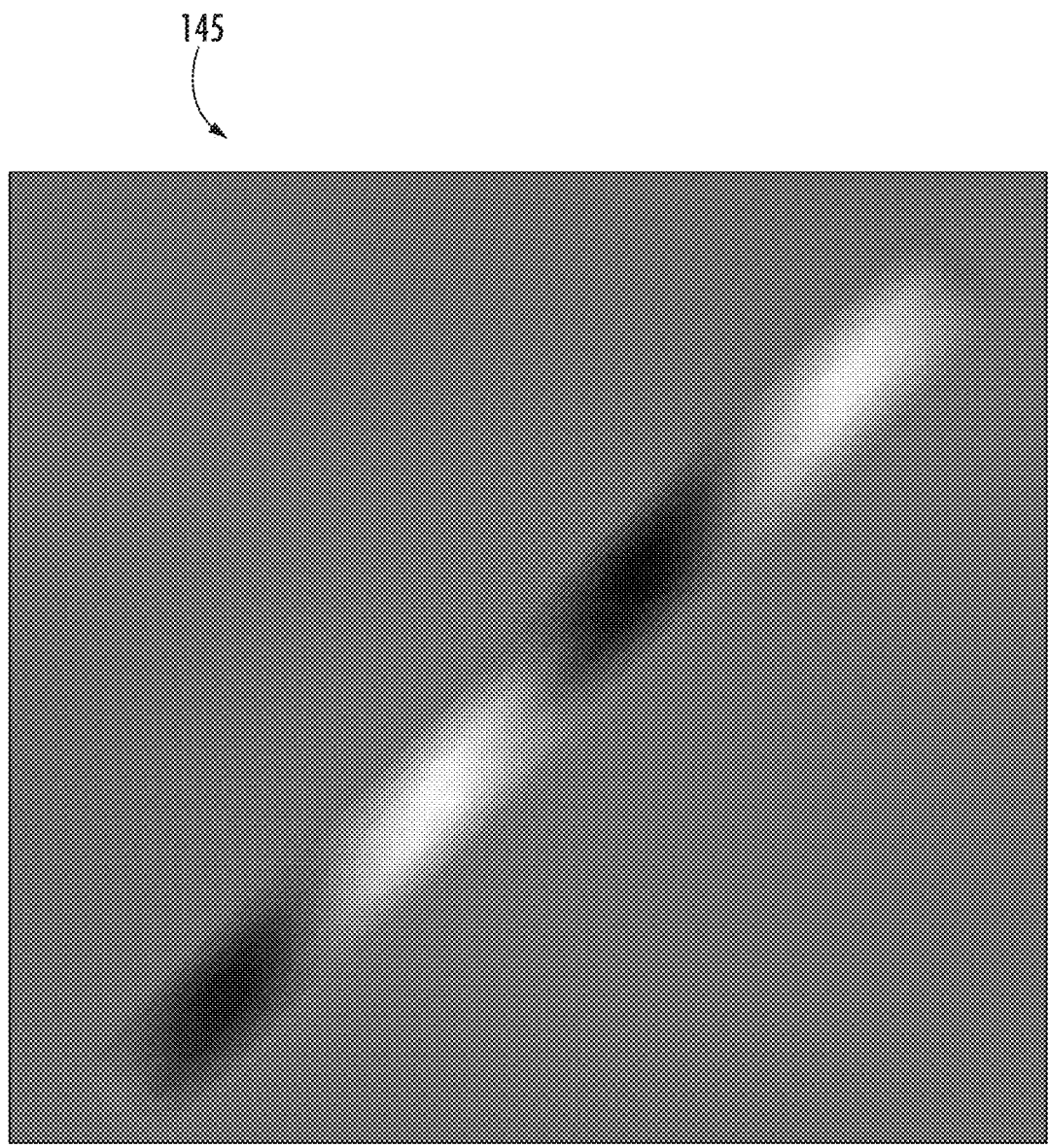
FIG. 5 depicts an image, which is the difference with an offset of the first image and the second image of FIGS. 4A-4B, according to embodiments of the present disclosure.

FIG. 5 demonstrates an image 145 including a light 125, which is the difference with an offset of the first image 122 and the second image 124 of FIGS. 4A-4B. Image 145 may be used to map the direct beam location, the tubing edge, and beams that intersect the tubing tangentially at different radial distances. The difference between the pattern of bright sections 151 and dark sections 152 of the first and second images 122, 124 shown in FIGS. 4A-4B is directly related to the retardation along the path of each ray. That is, the observed phase shift between first and second images 122, 124 is used to measure retardation. For example, a larger difference between the images correlates to a greater retardation, which translates to higher radial stresses in the tube 102. Variation from background grey 127 is related to retardation magnitude. Furthermore, the horizontal position on the detector of the light that passed through the tube 102 is dependent upon the tube diameter and the wall thickness. Tubing stress relative variation may be monitored from changes in light polarization state having passed through the wall. Additional information about the tubing diameter and wall thickness could be derived from the shift and fan shape of the exiting line shaped light 125 that entered at different distances from the tubing edge.

In some embodiments, the horizontal position is a function of the incident angle off normal to the outside surface of a particular ray of the beam, the index of refraction of the tubing. The calculation continues following the ray to the inside surface, where the angle of incidence relative to the inside surface normal where the beam reflects at the same angle on the other side of the surface normal. Then the beam continues to the outside surface, where the incident angle off normal to the outside surface of the ray of the beam, the index of refraction of the tubing and back to air define the exiting angle.

When there is no retardation in the optical path, the relative intensities of the two polarization state images is unchanged. In an optimally configured system, with no retardation, the difference between the two images would be zero (or a given offset). Therefore, in some embodiments, it may be advantageous to start with slightly elliptically polarized light to differentiate between direct, one surface, two surface, etc., reflected rays. The different paths can be differentiated by offsets in the difference of the 45 and 135-degree analysis images coming from circularity direction flips that happen in reflection.

Figure 6:
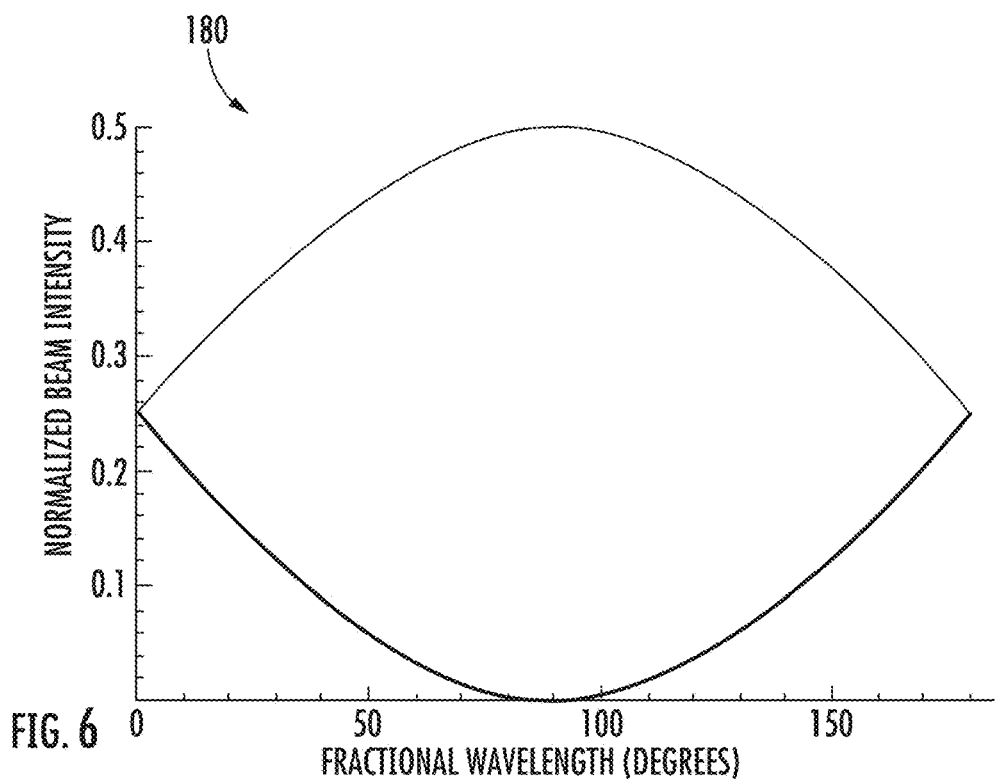
FIG. 6 is a graph of normalized beam intensity vs. fractional wavelength in degrees according to embodiments of the present disclosure.

Turning now to FIG. 6, calculated changes in intensity associated with retardation along an optical path as measured in fractional wavelengths according to embodiments of the present disclosure will be described in greater detail. As shown in graph 180, normalized beam intensity (0.0 to 1.0) vs. fractional wavelength in degrees (e.g., one wavelength=360 degrees) is plotted to demonstrate beam intensity as a function of retardation along the beam path. In this non-limiting example, the light source may be circular polarized light source, wherein two intensity outputs may change equal and opposite. In some embodiments, a Mueller matrix calculation may be performed including the following variables or parameters: an unpolarized light source, a linear polarizer at 0 degrees, a quarter wave plate (e.g., 90-degree phase shift at 45 degrees), the variable retardation, and analyzers, wherein the two states pass linear polarization of 45 and 135 degrees. As used herein, the variable retardation is the retardation affect from the stress in the wall integrated along the cord. This results in intensity in the first image 122 of the light 110 (FIG. 4A) at a first polarization state of 0.25+0.25 Sin[(p Retard)/180], and intensity in the second image 124 of the light 110 (FIG. 4B) of 0.25−0.25 Sin[(p Retard)/180]. From normalized intensity (0.0 to 1.0), the retardation magnitude (Ret) for the first 90 degrees is determined according to:

Ret=$K$×Arcsine(Intensity)

wherein K is scaling factor, a function of wavelength, units (Degrees or Rad), etc.

In this example, the retardation magnitude is in units of fractional wavelength in degrees, wherein one wavelength=360 degrees. At zero degrees, the change in intensity for an incremental retardation is maximized (highest sensitivity). At 90 degrees, the change in intensity per change in retardation is small. Past 90 degrees is a phase wrap in the result.

After determining the retardation magnitude from the light, the retardation profile may be determined by integrating the retardation magnitude for each light path (e.g. each ray) of the light. In some embodiments, a stress characterization/profile for the tubing may then be established based on the retardation profile and the retardation magnitude, wherein the angle of the light path relates to the primary stresses of the stress characterization/profile. As used herein, the primary stresses may be considered in tubing coordinates, such as axial stress traversing the length of the tubing, hoop stresses around the circumference of the tubing, and radial stresses along the radius of the tubing. The radial stresses may be a smaller value as compared to axial and hoop stresses. In some determinations, axial and hoop stresses as a function of radius may be considered similar.

Figure 7:
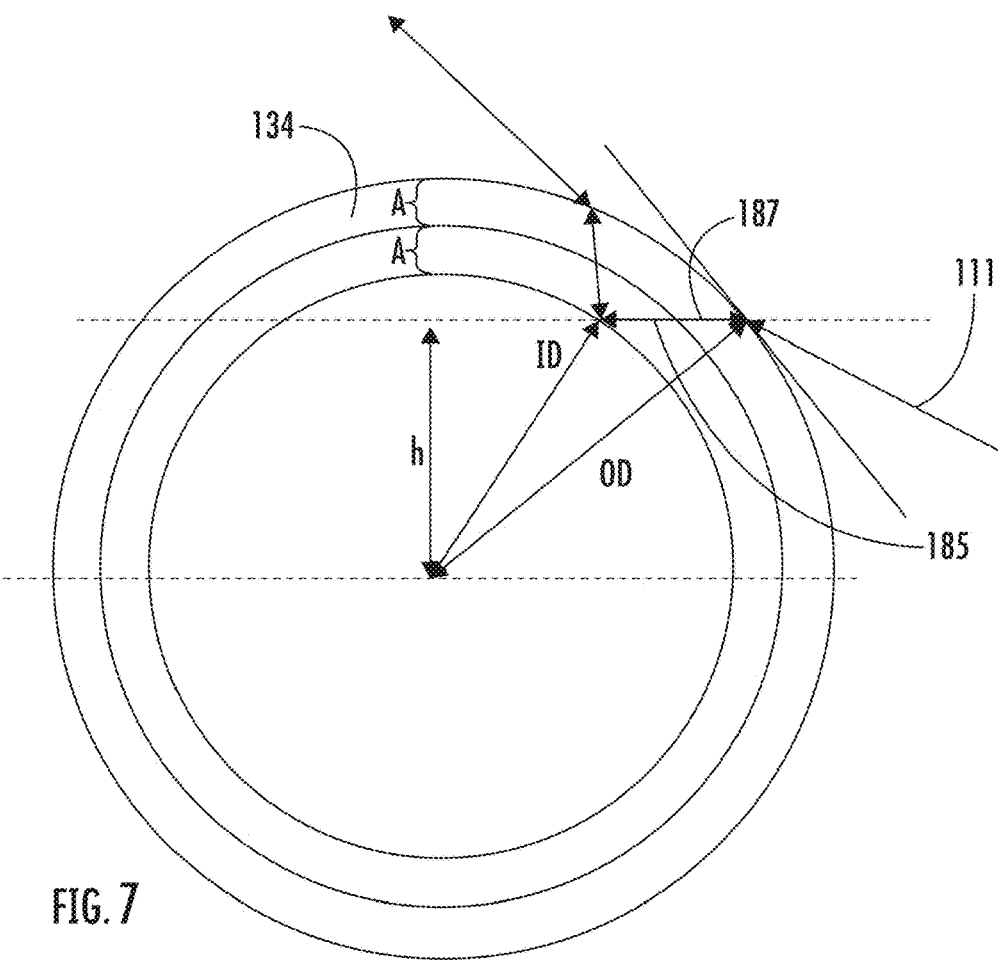
FIG. 7 demonstrates integration of the retardation magnitude for the light according to embodiments of the present disclosure.

Turning now to FIG. 7, integration of the retardation magnitude will be described in greater detail. In this example, a ray from the central portion of the beam 111 passing through the wall 134 refracts and as it passes through half (i.e., 'A') of the total thickness (i.e., A+A) of the wall 134. The ray will experience retardation based upon the stress profile for half, 'A.' The light path 187 traveled by the beam 111 through the wall 134 between the OD and the first half of the wall 134 is the OD chord length. Traveling the second half (i.e., 'A') of the thickness of the wall 134, the light path 185 passing through the wall 134 is the ID chord length. The total chord, light path 185+light path 187, may have a length 'L' defined as follows:

$$L = \frac{1}{2}([\text{OD chord length}] - [\text{ID chord length}]).$$

The relative length of a piece of the chord for a unit radius is different near the ID (e.g., larger) than near the OD. In one example, the ID chord length to mid wall at chord position 'h' is defined as: ID chord length=ID to ID+A. The OD chord length to and mid wall at chord position "h" is defined as: OD chord length=ID+A to ID+2A. As shown, 'A' is half the distance from OD to ID, and OD=ID+2*A. In this embodiment, the distance along the path of the cord is longer from ID to ID+A along light path 185 than from ID+A to OD along light path 187, which is ID+2*A.

Figure 8:
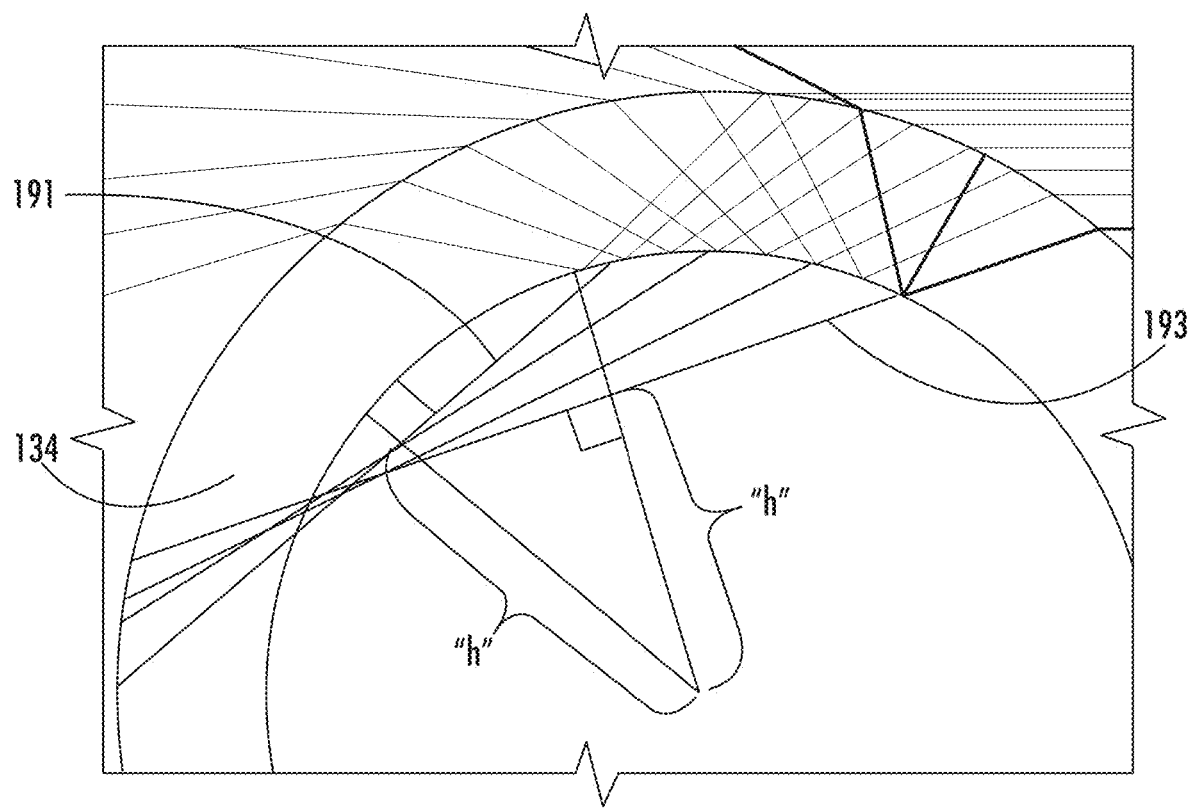
FIG. 8 demonstrates chords for different rays of the light passing through the tube wall according to embodiments of the present disclosure.

As shown in FIG. 8, changing "h" for the different chords gives different path lengths for the different rays (e.g., rays 191 and 193) in the beam passing through the wall 134. In this non-limiting embodiment, chord length (CL) may be determined as follows:

$$\frac{1}{2} \text{ CL at } h \text{ for ID} = \text{Sqrt}(\text{ID}^2 - h^2).$$

wherein C and L are portions of the optical path a particular ray of light is traveling over that will be integrating the retardation.

Furthermore, chord length for ID+A=Sqrt((ID+A)^2-h^2). For example, the chord lengths in FIG. 7 for the inner half the wall thickness of the light path 185 is the difference of the chord for location ID+A minus the chord length for ID. The chord length for ID+A may alternatively=Sqrt((ID+2*A)^2-h^2). The chord length for outer half the wall thickness of the light path 187 shown in FIG. 7 is the difference of the chord for location ID+2A minus the chord length for ID+A.

Figure 9:
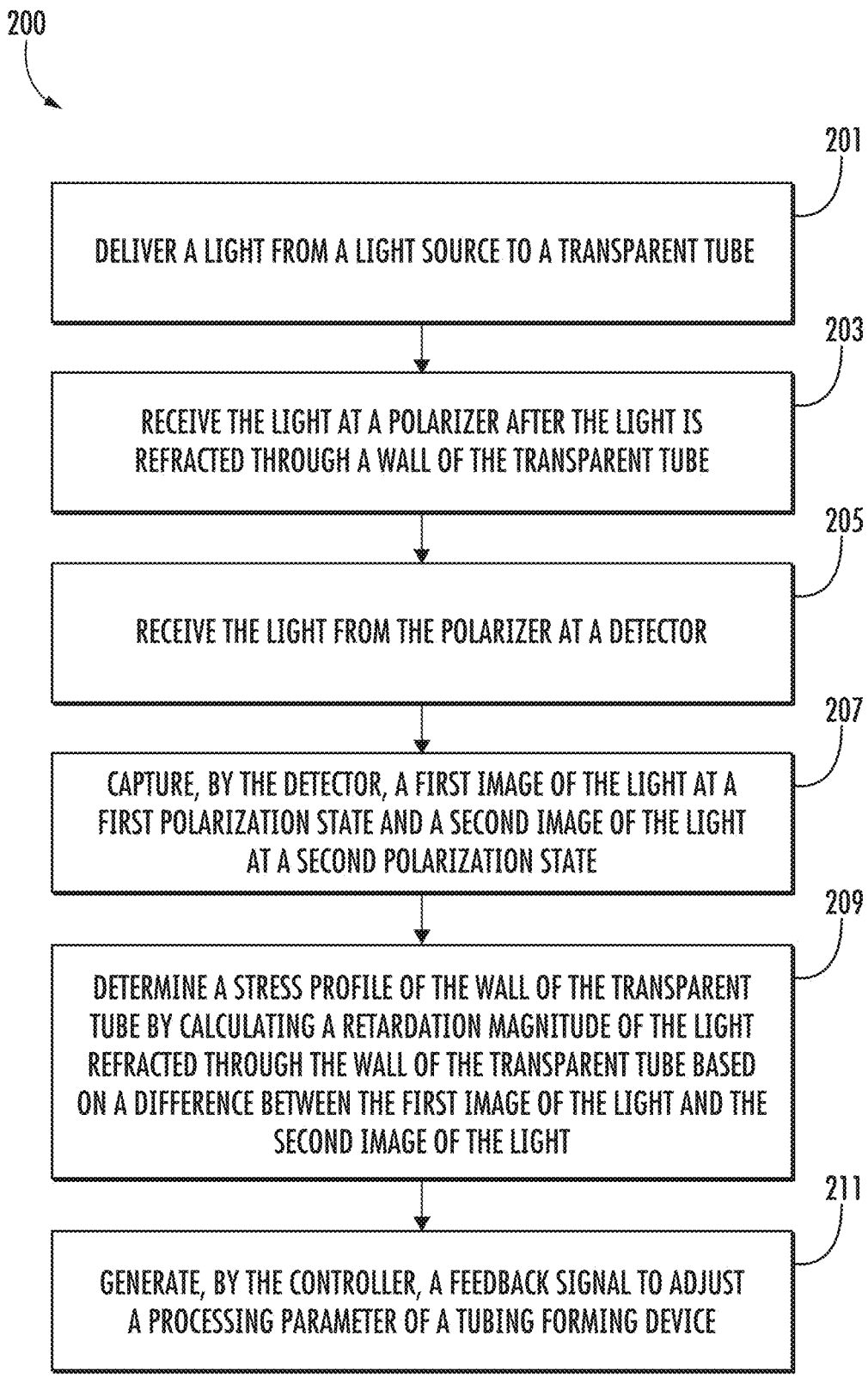
FIG. 9 is a process flow for determining a retardation profile of a tube wall according to embodiments of the present disclosure.

Turning now to FIG. 9, a method 200 for determining a retardation profile of a tubing wall according to embodiments of the present disclosure will be described in greater detail. As shown, at block 201, the method 200 may include delivering a light from a light source to a transparent tube. In some embodiments, the transparent tube is a transparent glass tube. In some embodiments, the light source is a circular polarized line light projector. In some embodiments, the polarization of the light might be switched, instead of or in combination with switching in front of the detector. In some embodiments, the light generated from the light source is a flat beam including a plurality of rays extending adjacent to one another along a same plane. In some embodiments, the light may be delivered to the tube at an angle relative to the lengthwise tube axis of less than ninety degrees and greater than zero degrees. In some embodiments, the light may be delivered to the tube at an angle relative to the lengthwise tube axis of approximately 45 degrees.

At block 203, the method 200 may include receiving the light at a polarizer after the light is refracted through a wall of the transparent tube. In some embodiments, the polarizer includes a FLC. In some embodiments the polarizer may include a ¼ wave plate and linear polarizer as a circular analyzer.

At block 205, the method 200 may include receiving the light from the polarizer at a detector. In some embodiments, the detector is an array detector, such as a camera sensor. In some embodiments the camera may incorporate oriented polarizers associated with pixels or groups of pixels. In some embodiments, the detector may receive a portion of the light directly from the light source. Said another way, a portion of the light may not pass through the tube before being received at the detector.

At block 207, the method may include capturing, by the detector, a first image of the light at a first polarization state and a second image of the light at a second polarization state. In some embodiments, block 207 may include switching, using a driver of the polarizer, between the first polarization state and the second polarization state. For example, the driver may switch between +5 Volts and −5 Volts, thus causing the two states to pass linear polarization of 45 and 135 degrees. An image is taken at each polarization state.

At block 209, the method 200 may include determining a retardation magnitude of the light refracted through the wall of the transparent tube based on a difference between the first image of the light and the second image of the light. In some embodiments process conditions may be monitored/controlled with the retardation information. In some embodiments, the retardation profile is determined by a controller operable with the detector and the polarizer. In some embodiments, the controller is further operable to determine a diameter of the transparent tube and a thickness of the wall of the transparent tube.

In some embodiments, the stress profile may then be determined based on the determined retardation profile/magnitude. To determine the detailed stress profile, often a combination of measurements and modeling is required to define nominal process conditions and limits for the process. Determination of the stress profile may be achieved in a production environment on every part desired without having to cut or otherwise handle each part. The nominal and limit stress profiles can then be used to set process monitoring values from this measurement system. For example, at block 211, the method 200 may include generating, by the controller, a feedback signal to adjust a processing parameter of a tubing forming device, wherein the feedback signal may be generated based on at least one of the retardation profile of the wall of the tube, the diameter of the tube, and/or the thickness of the wall of the tube.

It will be appreciated that the method 200 may be executed using one or more processor components or controllers, such as the controller 126, for executing one or more of blocks 201, 203, 205, 207, 209, and 211. Although the method 200 may depict a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. For example, a logic flow may be implemented by a processor component executing instructions stored on an article of manufacture, such as a storage medium. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

In sum, at least the following technical advantages are achieved by the embodiments of the present disclosure. Firstly, the system and methods herein permit online tubing stress measurement because the tubing does not require sectioning or polishing. If already cut, measurement does not require placement in an immersion tank. Measuring is a continuous process, taken at a rate only limited by camera frame rates and polarization switching of the Ferroelectric liquid crystal, if used.

Secondly, the position requirements are less stringent. For example, mechanical alignment can be in millimeters instead of micrometers, and the system is capable of detecting the current position of the tube. Alignment is less critical because the shape of the signal on the array sensor provides information about specimen position and the light path. The system provides self-alignment.

Thirdly, the polarization orientation of the light source and detectors maximizes the sensitivity of the system since each is in the region where the light intensity change per unit of retardation is maximized and in opposite polarity. As a result, the difference signal is maximized.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

As used herein, the singular forms "a," "an," and "the" are intended to include the plural forms as well, unless the context clearly indicates otherwise. It will be further understood that the terms "comprises" and/or "comprising," or "includes" and/or "including" when used herein, specify the presence of stated features, regions, steps elements and/or components, but do not preclude the presence or addition of one or more other features, regions, integers, steps, operations, elements, components and/or groups thereof.

For the sake of convenience and clarity, terms such as "top," "bottom," "upper," "lower," "vertical," "horizontal," "lateral," and "longitudinal" will be used herein to describe the relative placement and orientation of various components and their constituent parts. Said terminology will include the words specifically mentioned, derivatives thereof, and words of similar import.

Furthermore, in the following description and/or claims, the terms "on," "overlying," "disposed on" and "over" may be used in the following description and claims. "On," "overlying," "disposed on" and "over" may be used to indicate that two or more elements are in direct physical contact with each other. However, "on,", "overlying," "disposed on," and over, may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A measurement system, comprising:
 a light source delivering a light to a tube;
 a polarizer receiving the light after the light is refracted through a wall of the tube;
 a detector receiving the light from the polarizer, the detector operable to capture a first image of the light at a first polarization state and a second image of the light at a second polarization state; and
 a controller operable to determine a retardation profile of the wall of the tube by determining a retardation magnitude of the light refracted through the wall of the tube based on a difference between the first image of the light and the second image of the light.

2. The measurement system of claim 1, wherein the polarizer includes a driver operable to switch between the first polarization state and the second polarization state.

3. The measurement system of claim 2, wherein the polarizer includes a ferroelectric liquid crystal.

4. The measurement system of claim 1, wherein the controller is further operable to sum the first image and the second image to determine each of: a direct beam location, an edge of the tube, and a beam intersecting the tube tangentially at different radial distances.

5. The measurement system of claim 1, the controller further operable to determine a diameter of the tube and a thickness of the wall of the tube.

6. The measurement system of claim 1, wherein the light source is a circular polarized line light projector, wherein the detector is an array detector, and wherein the light is a collimated line-shaped beam.

7. The measurement system of claim 6, wherein the tube has a lengthwise tube axis extending through a center of the tube, and wherein the collimated line-shaped beam is delivered to the tube at an angle relative to the lengthwise tube axis of less than ninety degrees and greater than zero degrees.

8. The measurement system of claim 6, wherein the collimated line-shaped beam is delivered to the tube at an angle relative to the lengthwise tube axis of approximately forty-five degrees.

9. The measurement system of claim 1, wherein the tube is a transparent tube.

10. A non-contact tubing measurement system, comprising:
    a light source delivering a light to a transparent tube, the light being a collimated line-shaped beam;
    a polarizer receiving the light after the light is refracted through a wall of the transparent tube;
    a detector receiving the light from the polarizer, the detector operable to capture a first image of the light at a first polarization state and a second image of the light at a second polarization state; and
    a controller operable to determine a retardation profile by determining a retardation magnitude of the light refracted through the wall of the transparent tube based on a difference between the first image of the light and the second image of the light.

11. The non-contact tubing measurement system of claim 10, wherein the polarizer includes a ferroelectric liquid crystal having a driver operable to switch between the first polarization state and the second polarization state.

12. The non-contact tubing measurement system of claim 10, the controller further operable to determine a diameter of the transparent tube and a thickness of the wall of the transparent tube.

13. The non-contact measurement system of claim 10, wherein the light source is a circular polarized line light projector, and wherein the detector is an array detector.

14. The measurement system of claim 10, wherein the transparent tube has a lengthwise tube axis extending through a center of the tube, and wherein the light is delivered to the transparent tube at an angle relative to the lengthwise tube axis of less than ninety degrees and greater than zero degrees.

15. A method for determining a retardation profile of a tubing wall, the method comprising:
    delivering a light from a light source to a transparent tube;
    receiving the light at a polarizer after the light is refracted through a wall of the transparent tube;
    receiving the light from the polarizer at a detector;
    capturing, by the detector, a first image of the light at a first polarization state and a second image of the light at a second polarization state; and
    determining a retardation profile of the transparent tube from a retardation magnitude of the light refracted through the wall, wherein the retardation magnitude is determined based on a difference between the first image of the light and the second image of the light.

16. The method according to claim 15, further comprising switching, using a driver of the polarizer, between the first polarization state and the second polarization state.

17. The method according to claim 15, further comprising determining a diameter of the transparent tube and a thickness of the wall of the transparent tube.

18. The method according to claim 15, further comprising delivering a collimated line-shaped beam to the transparent tube at an angle relative to the lengthwise tube axis of less than ninety degrees and greater than zero degrees.

19. The method of claim 18, further comprising delivering the collimated line-shaped beam at an angle relative to the lengthwise tube axis of approximately forty-five degrees.

20. The method of claim 18, further comprising:
    positioning the tube between the light source and the polarizer; and
    delivering the collimated line-shaped beam from the light source to the transparent tube.

* * * * *

UNITED STATES PATENT AND TRADEMARK OFFICE
CERTIFICATE OF CORRECTION

PATENT NO.        : 10,871,400 B2
APPLICATION NO.   : 16/534083
DATED             : December 22, 2020
INVENTOR(S)       : William John Furnas It is certified that error appears in the above-identified patent and that said Letters Patent is hereby corrected as shown below:

In the Claims

In Column 15, Lines 13-14, Claim 5, delete "the controller further" and insert -- wherein the controller is further --, therefor.

In Column 16, Line 4, Claim 12, delete "the controller further" and insert -- wherein the controller is further --, therefor.

In Column 16, Line 7, Claim 13, delete "non-contact measurement" and insert -- non-contact tubing measurement --, therefor.

In Column 16, Line 10, Claim 14, delete "The measurement" and insert -- The non-contact tubing measurement --, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*